Figure 1:
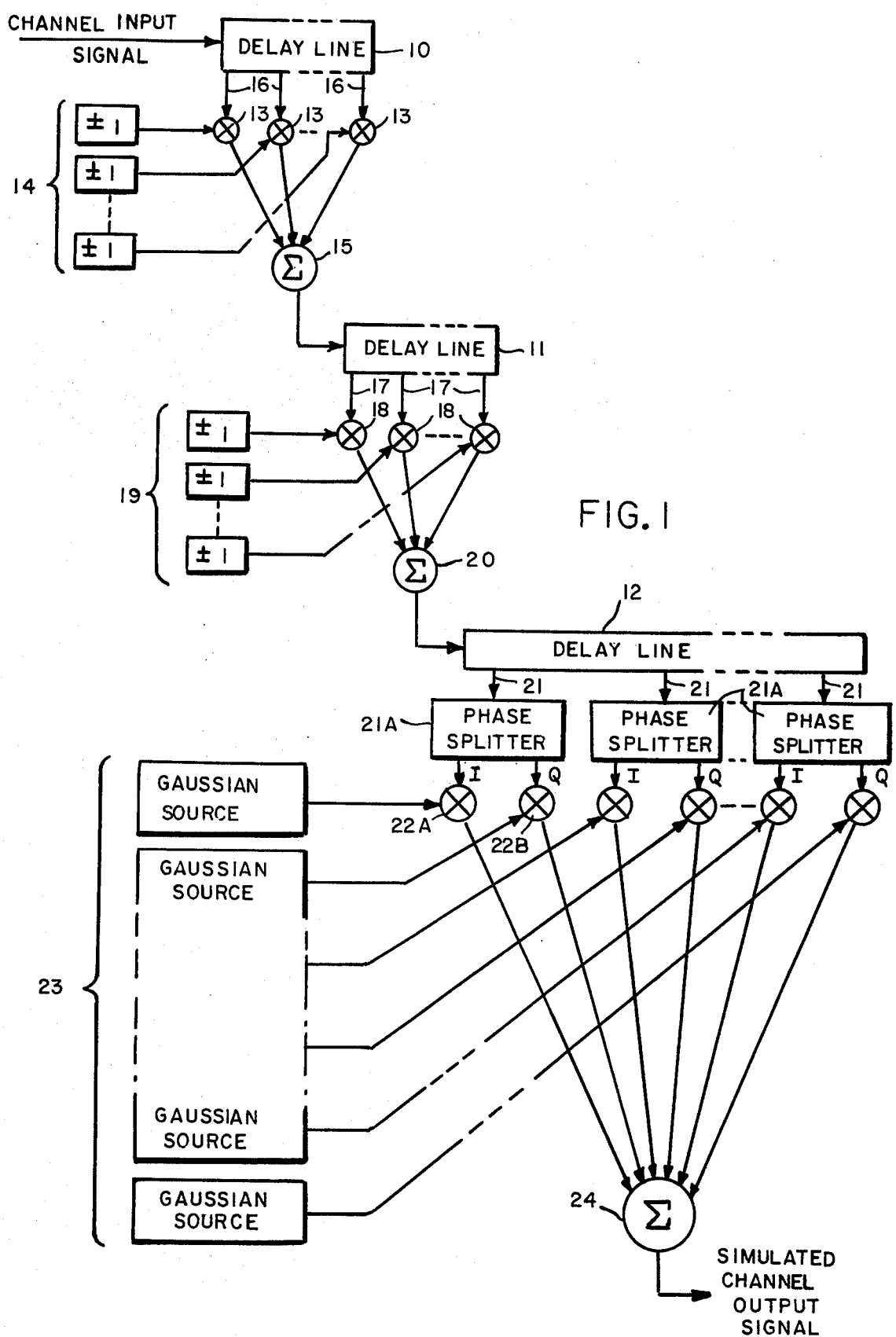

United States Patent

Pierce et al.

[11] 4,105,958
[45] Aug. 8, 1978

[54] LARGE DELAY SPREAD CHANNEL SIMULATOR

[75] Inventors: John Norman Pierce, Lexington; Steen Allan Parl, Belmont, both of Mass.

[73] Assignee: Signatron, Inc., Lexington, Mass.

[21] Appl. No.: 654,511

[22] Filed: Feb. 2, 1976

[51] Int. Cl.² ................... H03H 7/14; H03H 7/22; H03H 7/28; H03H 7/30

[52] U.S. Cl. .................... 333/29; 333/70 T

[58] Field of Search ............. 333/29, 70 T, 70 R, 333/28 R, 18, 23; 328/165, 167, 162; 235/181; 325/42, 65, 473–477; 307/262; 364/819, 485, 728

[56] References Cited

U.S. PATENT DOCUMENTS

| | | | |
|---|---|---|---|
| 3,271,703 | 9/1966 | Kaenel | 333/28 R |
| 3,597,541 | 8/1971 | Proakis et al. | 325/42 X |
| 3,624,562 | 11/1971 | Fujimura | 333/70 T X |

Primary Examiner—Alfred E. Smith
Assistant Examiner—Marvin Nussbaum
Attorney, Agent, or Firm—Robert F. O'Connell

[57] ABSTRACT

An apparatus for simulating the characteristics of a signal channel which uses two or more cascaded delay lines each of which in one embodiment has a single input and a plurality of tapped outputs. The tapped output signals from each delay line are each multiplied by randomly characterized signals and the multiplied signals are combined to supply an input signal to the next succeeding delay line. The input signal to the first of the cascaded delay lines is the channel input signal and the output of the last of the cascaded delay lines is the simulated channel output signal. The randomly characterized signals associated with all but one of the delay lines may be signals having random polarities or having random phases while the randomly characterized signals associated with the remaining one of the delay lines has Gaussian characteristics. Appropriate control of the amplitude of the Gaussian characterized signals permits an approximation to be made of the energy distribution of the signal channel which is being simulated.

19 Claims, 7 Drawing Figures

LARGE DELAY SPREAD CHANNEL SIMULATOR

INTRODUCTION

This invention relates generally to signal channel simulators and, more particularly, to such channel simulators which utilize tapped delay lines for simulating a large spread of signal delays which occur in a transmission channel.

BACKGROUND OF THE INVENTION

In testing signal transmitting and receiving equipment which will be used over certain types of signal channels in which signal scattering and, hence, delays occur, it is desirable to use simulator equipment which will simulate as accurately as possible the characteristics of the signal channels involved. Thus, in wide band communication systems wherein the signal travels over the ocean, for example, the communication signal is often scattered back to the receiver with delays spread much more than the reciprocal of the signal bandwidth.

In simulating such delays, conventional channel simulators utilize a single, tapped delay line having a relatively large number of taps spaced therealong in accordance with conventional "Nyquist" spacing. In order to provide sufficiently accurate simulation in some applications, such a multi-tapped delay line simulator often requires more taps than is technically and economically feasible. For example, if a 50 microsecond delay spread occurs in the channel and the communication signal utilizes at 100 MHz bandwidth, such a Nyquist-spaced delay line would require 5000 taps therealong, with a Nyquist spacing of 10 nanoseconds. When such large bandwidths must be accommodated, it is not economically feasible to reproduce exactly the statistical characteristics of such large multipath delay spreads, such as can arise from ocean scattering, for example.

Conventional Nyquist spaced simulators as would be available for some applications are shown and described, for example, in the publication "Theory of a Tapped Delay Line Fading Simulator" by S. Stein, First IEEE Annual Communication Convention, Conference Record, Boulder, Colorado, June 7-9, 1965. The major cause for the high cost of such simulators lies in the fact that each tap is required to feed a signal to a multiplier and multiplied by a signal having Gaussian characteristics, such Gaussian signals being independent from each other at each tap. The large number of multipliers and the large number of independent Gaussian signal sources greatly increases the cost of the simulator for large bandwidth signals so that, in many applications, the overall costs become prohibitive and simplification thereof at the expense of accuracy becomes necessary.

In order to avoid excessive costs, it has been suggested that many of the Nyquist spaced taps simply be omitted to approximate as well as possible the channel characteristics, the accuracy of reproduction being traded off for such reduced cost factors. In such reduced-tap configurations, however, the energy concentrations at each tap are increased, since the total energy is utilized with fewer taps. Such a system would not provide realistic simulation under all conditions. For example, if, in an actual channel, the energy at a particular delay is lost, an actual receiver would simply move to an adjacent delayed signal during actual operation. In a simulator which uses an appropriate and relatively large number of taps at Nyquist spacing for simulating such a channel, if energy is lost at any one tap, the receiver would in a corresponding manner move to an adjacent Nyquist-spaced tap. However, in a simulator in which the relatively large number of taps is reduced considerably in order to avoid the high costs thereof, if a loss of energy occurs at any one of the taps, the receiver could not always move to an adjacent Nyquist-spaced tap because such adjacent tap may no longer be present in the simulator device. The simulation would thereupon become misleading and would incorrectly appear to simulate a situation in which the receiver is indicated as being non-operative when, in an actual situation, the receiver would be operative. Hence, the overall system's ability to simulate actual operating conditions of a signal channel is considerably reduced if the total number of taps at Nyquist spacing is reduced to a fewer number at spacings much larger than the normally required Nyquist spacing.

SUMMARY OF THE INVENTION

This invention concerns a simulator which provides an accurate simulation of a delay spread channel with the use of a relatively few number of taps, so that not only is the overall system relatively less costly to make than presently available conventional simulators, but also problems, normally encountered when fewer taps are used, are avoided so that the overall simulator retains its ability to simulate realistically in substantially all situations.

In accordance therewith, the system of the invention utilizes a plurality of cascade-connected delay lines, each having a selected number of tap outputs connected to multipliers which multipliers are further responsive either to randomly switched signals, to signals having random phases, or to signals having Gaussian characteristics as required by the simulation which is desired. The outputs of the multipliers associated with each of the cascade-connected delay lines are suitably summed to provide a delay line output signal. The input signal to the first of the cascade-connected delay lines is the channel input signal and the output from the last of the cascade-connected delay lines is the simulated channel output signal. Each of the input signals to all of the delay lines other than the first delay line is the delay line output signal from the immediately preceding delay line of the overall cascade-connected arrangement. The randomly switched signals, the randomly phased signals, and the Gaussian signals supplied to the multipliers are selected to provide characteristics which are determined by the characteristics of the energy vs. time delay profile which is associated with the signal channel which is to be simulated.

Figure 1A:
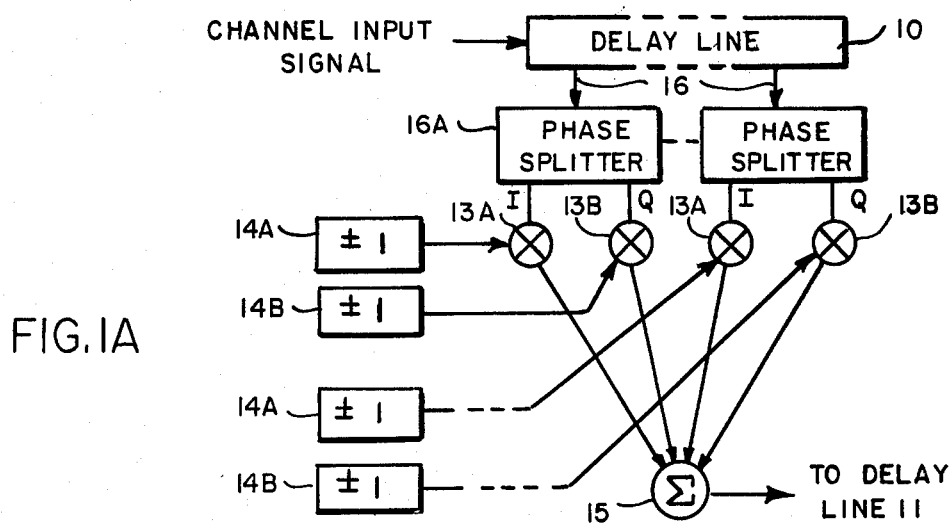

A more detailed description of the system of the invention can be described with the help of the accompanying drawings wherein FIG. 1 shows a block diagram of a particular embodiment of the invention utilizing three cascade-connected delay lines;

FIG. 1A shows a block diagram of an alternative embodiment of a portion of the embodiment shown in FIG. 1.

Figure 2:
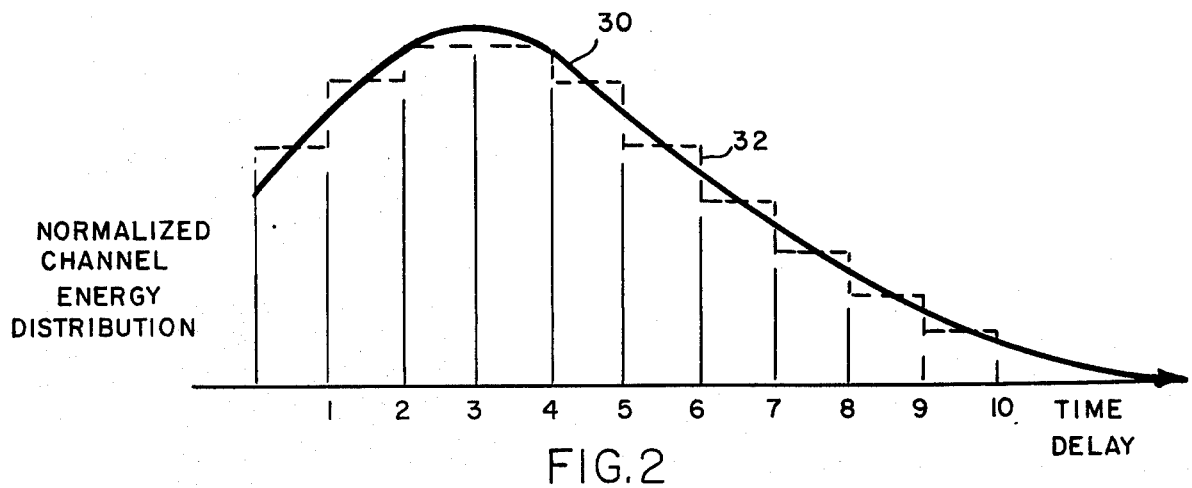
Figure 2A:
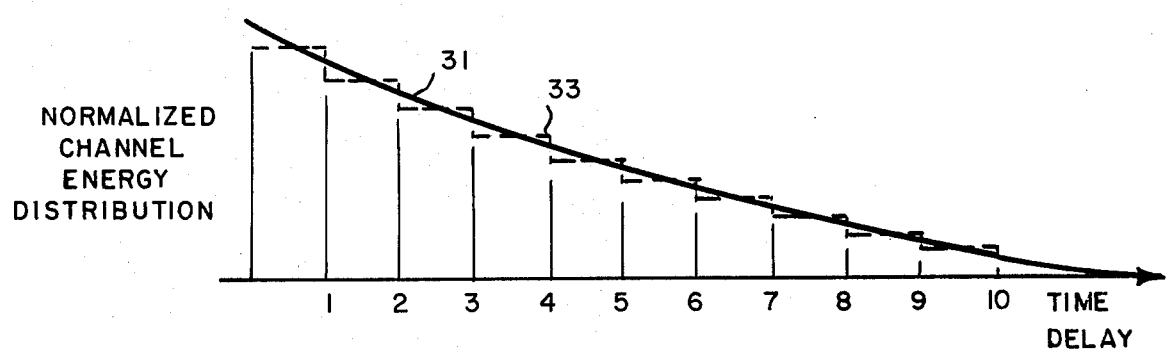
Figure 2B:
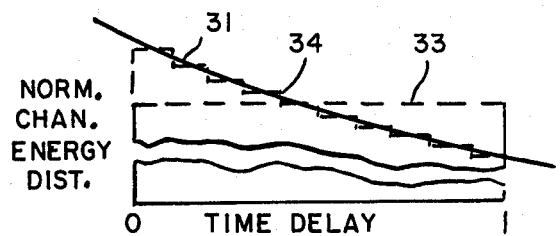
Figure 3:
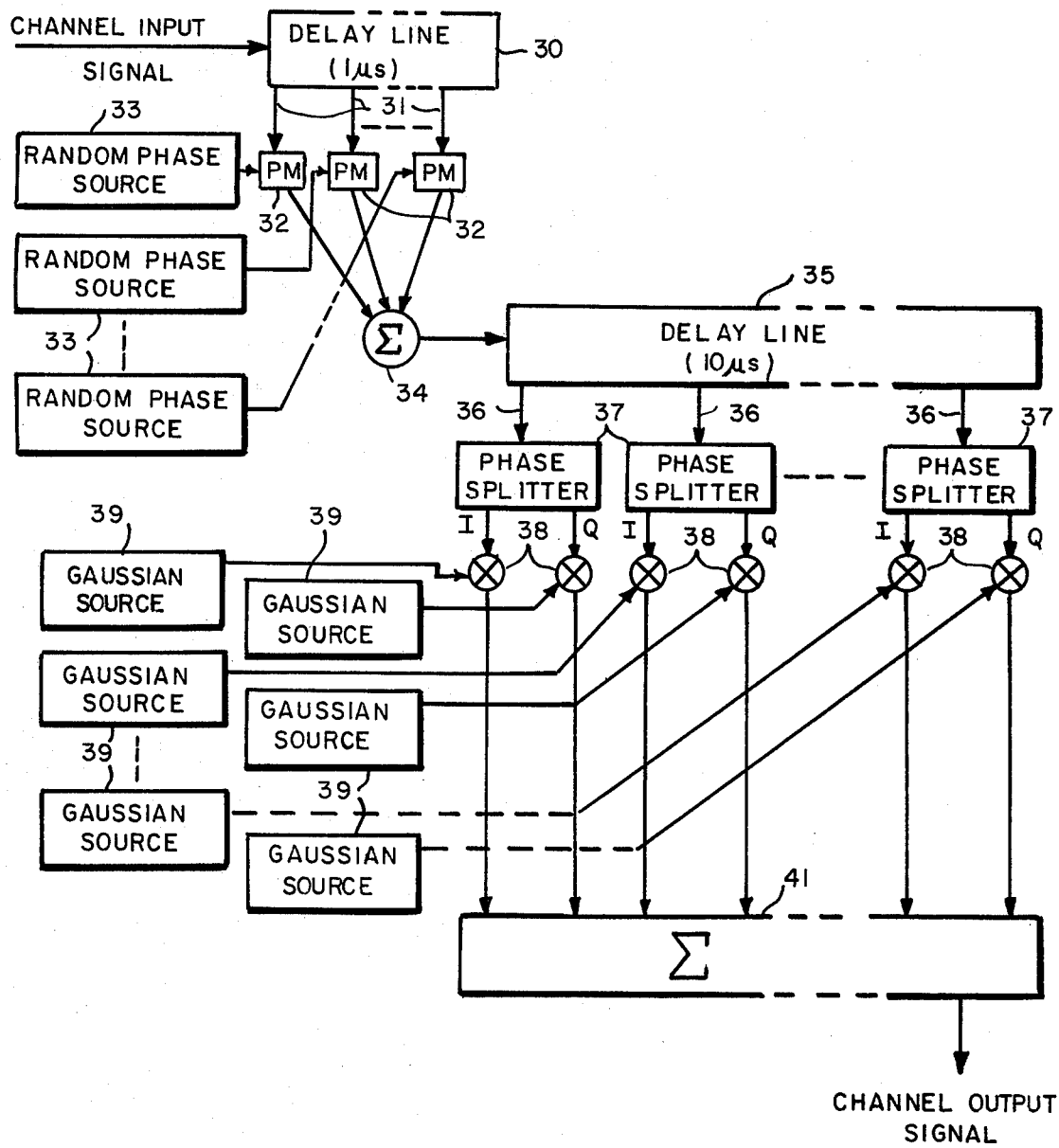
Figure 4:
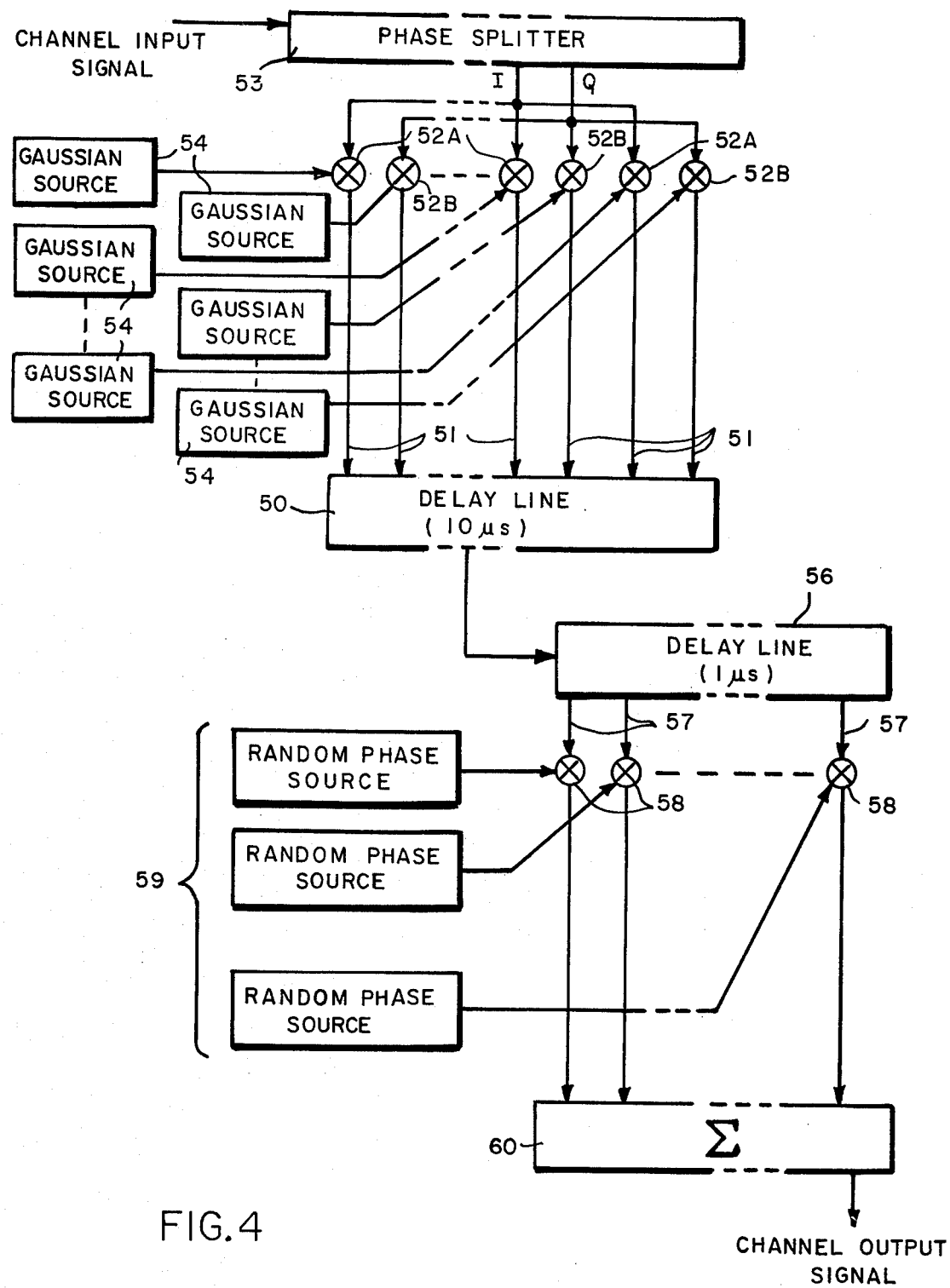

FIGS. 2A, and 2B show graphs of typical energy vs. time delay profiles of channels which can be simulated by cascade-connected delay line systems in accordance with the invention;

FIG. 3 shows a block diagram of a further alternative embodiment of the invention; and FIG. 4 shows a block diagram of still another embodiment of the invention.

As can be seen in FIG. 1, a simulator in accordance with the invention utilizes a plurality of cascade-connected delay lines 10, 11 and 12. The first delay line 10 of the cascaded arrangement has supplied thereto a channel input signal as shown. Delay line 10 has a plurality of tapped outputs 16 spaced therealong, a specific embodiment of which may have, for example, ten taps. The output from each of the plurality of taps 16 is supplied separately to one of a plurality of multipliers 13 which also have supplied thereto a second multiplier input signal the characteristics of which are determined by the characteristics of the signal channel to be simulated, as discussed in more detail below. In the specific embodiment shown in FIG. 1 such multiplier signals, for example, may be supplied from a plurality of random switching circuits 14 each of which provides a randomly switched output signal the polarity of which varies between two values or states (e.g. ±1) in a random fashion. The outputs of all of the multipliers 13 are summed at a summation circuit 15 which provides a delay line output signal therefrom.

The delay line output signal from summation circuit 15 is supplied as the input signal to second delay line 11 which latter delay line also has a plurality of tapped outputs 17 which in the specific embodiment shown may, for example, include ten tapped outputs appropriately spaced therealong. The tapped outputs from the second of the cascaded delay lines are fed to a plurality of separate multipliers 18 each of which is also supplied with an appropriate signal determined by the signal channel characteristics. In the specific example shown in FIG. 1, such latter signal may be supplied in a similar manner from a plurality of appropriate random switching circuits 19 of the same general character as the switching circuits 14 discussed above. The outputs of multipliers 18 are fed to a summation circuit 20 which supplies a delay line output signal for the last of the cascaded delay lines of the overall configuration.

The latter delay line 12 also has a plurality of tapped outputs 21 spaced therealong, which, for example, may comprise ten taps as in previously discussed delay lines. The tapped outputs are each separated into in-phase and quadrature components designated as I and Q, respectively, by phase splitting devices 21A, the in-phase component being supplied to one input of each of a plurality of multipliers 22A and the quadrature components being supplied to one input of a plurality of multipliers 22B. Each of the multipliers 22A and 22B has supplied thereto a signal having appropriate signal amplitude fluctuation characteristics determined by the signal channel. Generally, the signal amplitude fluctuation characteristics of most communication signal channels is Gaussian in nature and, therefore, multipliers 22A and 22B are supplied with a signal having Gaussian characteristics from a plurality of separate Gaussian signal sources 23. Moreover, only one delay line can utilize Gaussian multipliers for that purpose as shown in FIG. 1 and in other embodiments described below. The outputs of multipliers 22A and 22B are supplied to an appropriate summation circuit 24, the output of which provides the simulated channel output signal.

In the implementation of the invention, as shown in FIG. 1, the random switching circuits 14 and 19 should preferably be arranged so that switching from +1 to −1 states and from −1 to +1 states for supplying switching inputs to multipliers associated with each of the taps thereof should be done at staggered times to avoid undesirably large transient switching signals which would occur if a plurality of said switching circuits switched states simultaneously.

Further, the spectral widths of each of the Gaussian sources 23 may be substantially the same. Alternatively, the pair of Gaussian sources associated with each tap can supply Guassian signals having the same spectral width for the I and Q components from such tap while such spectral width differs from the spectral width of the signals supplied by each of the other pairs of Gaussian sources associated with each of the other taps. Such different spectral widths permits the "Doppler spread" or fade rate of the channel to be a function of a multiplier delay which is characteristic, for example, of a signal channel having certain types of ocean scattered returns.

Moreover, with respect to the random switching operations associated with delay lines 10 and 11, it is also possible to use different switching rates for the polarity switching which occurs at different delay line taps thereof.

In accordance with the configuration shown in FIG. 1, the first delay line 10 provides a total signal delay of 100 nanoseconds so that each of the ten taps theralong are spaced at 10 nanosecond intervals. The second delay line 11 provides a total signal delay of 1000 nanoseconds, so that the ten tapped outputs are spaced therealong at intervals of 100 nanoseconds. Delay line 12 provides a total delay of 10 microseconds so that the ten taps are spaced therealong at intervals of 1 microsecond (i.e., 1000 nanoseconds).

The overall cascade-connected delay line implementation shown in FIG. 1 provides a total delay spread of 10 microseconds for a signal having 100 MHz bandwidth. A convention Nyquist-spaced delay line simulator would require 1000 taps with a Nyquist spacing of 10 nanoseconds. However, as can be seen by the configuration of FIG. 1, a total of only 30 taps is utilized to provide the same effective simulation with a three-stage cascade-connected delay line arrangement in accordance with the invention.

In the configuration of FIG. 1, the total 10-microsecond delay is divided by delay line 12 into 10 1-microsecond intervals each of which is modulated by an independent Gaussian signal. Thus, each Gaussian multiplier 22 affects the signal equally over its corresponding 1-microsecond interval. Each 1-microsecond delay is then subsequently subdivided into 100 subintervals by the preceding delay lines, over which subintervals the polarity is switched randomly at multipliers 13 and 18. The scattering function of the signal channel to be simulated is thereby approximated by adjusting the Doppler bandwidth on the individual Gaussian multiplier taps. Since a signal passing through the channel is only multiplied by a Gaussian signal once, the Gaussian distributions of the signals are preserved by the use of the independent Gaussian multipliers only with respect to one of the delay lines. The ensemble statistics of the channel which is being simulated can be readily computed, the output of the channel in the configuration of FIG. 1 being written as $$\sum_{k=1}^{10} \sum_{j=1}^{10} \sum_{i=1}^{10} a_k b_j c_i s(t - it_o - jt_o - dt_o)$$

where $t_o$ is the tap spacing on the first delay line 10. In the example shown in FIG. 1, $t_o = 10$ nanoseconds, $a_k$ is the Gaussian multiplier for the third delay line stage 12, $b_j$ is a sign modulator for the second delay line stage 11, and $c_i$ is a sign modulator for the first delay line stage 10. Thus, the overall system is equivalent to a 10-microsecond delay line tapped at 10-nanosecond intervals and modulated by $a_k b_j c_i$ respectively, at the delay $(100k + 10j + i)t_o$. Each multiplier $a_k b_j c_i$ has a Gaussian distribution with zero means and variance $a_k^2$ where $a_k^2$ are the variances of the tap multipliers in the last stage in FIG. 1. Furthermore, the multipliers $a_k b_j c_i$ are statistically uncorrelated in pairs.

It is apparent from the configuration of FIG. 1 that the total number of taps utilized is reduced considerably. The three stages each having N taps (where N = 10) form the equivalent of a single delay line having $N^3$ taps but utilizing only 3N taps and N Gaussian multipliers. While the specific configuration shown consists of shorter delay lines feeding output signals to longer delay lines, with the Gaussian multipliers on the longest line, it is not necessary that such a specific configuration be utilized for simulation. The order in which the lines are placed is not necessarily significant and the delay lines may be interchanged with no degradation of operation of the simulator.

One advantage, however, of providing the Gaussian multipliers on the longest line is that the overall shape of the delay spread and the delay power spectrum (i.e., the overall scattering function) can then be controlled by control of the amplitudes of the signals supplied by the Gaussian multipliers. For certain multipath energy profiles different fixed attenuations can also be used on different taps of the shorter delay lines to yield a slightly more accurate shape of the energy vs. delay profile. Such energy profile shaping can be explained with the help of FIGS. 2 and 2A for example. Moreover, the position of the Gaussian multipliers can be changed and the Gaussian multipliers may be utilized to feed the multipliers associated with any one of the three delay lines to achieve different effects on the fine structure of the scattering function and without affecting the property of pairwise independence developed above.

Thus, in order to simulate a particular signal channel operation, it is necessary to determine the average energy profile (i.e., the curve of energy vs. time delay) thereof by making appropriate physical measurements on the actual channel to be simulated using techniques well-known to those in the art. Such energy profiles may be of the form, for example, of curves 30 and 31 shown in FIGS. 2A and 2B, respectively. With reference to FIG. 2, for example, it is possible to simulate the energy distribution by scaling Gaussian multiplier pairs of FIG. 1 over the time delays associated with each of the ten taps so as to approximate the average energy over the ten delays involved by appropriately controlling the amplitude of the Gaussian input signals supplied thereto. Such a scaling produces an approximation to the actual energy distribution 30 as depicted by the stepwise curve shown by dashed line 32 in FIG. 2.

In FIGS. 2A & B, where the energy distribution is of such a character that it continuously decreases over the total time delay, as shown by continuous curve 31, the approximation in FIG. 2A of dashed line curve 33 thereof can be made even closer by appropriately providing different fixed attenuations at the multipliers associated with the next shorter delay lines (i.e., delay line 11 in FIG. 1). Thus, provision of suitable attenuators with each of the multipliers 18 can provide outputs therefrom which, superimposed on that provided by the Gaussian multipliers 22 of the longer delay line 12 (curve 33), approximates the curve 31 over each delay interval of delay line 11 as shown by step-wise curve 34, as seen more clearly in the enlarged view of FIG. 2B over the first time delay interval 0 to 1 of FIG. 2A.

While the specific cascaded configuration of FIG. 1 discussed above for the 10-microsecond delay provides a simulator utilizing 30 taps, which is equivalent to a conventional delay line simulator using Nyquist spacing of 1000 taps, the number of taps at each stage need not be the same. A larger number of stages with a smaller number of taps at each stage may be utilized to provide the equivalent of the 1000 taps convention configuration. Thus, while the configuration of FIG. 1 shows 10 taps at each of three stages (wherein $10 \times 10 \times 10 = 1000$), an alternate configuration may utilize, for example, six stages wherein the first four stages utilize 3 taps and the last two stages utilize 4 taps ($3 \times 3 \times 3 \times 3 \times 4 \times 4 = 1296$). Other variations wherein the total number of taps is effectively made equivalent to 1000 taps would be appropriate therein. In each case, as discussed above, only one of the stages uses Gaussian multipliers.

In those stages which do not utilize Gaussian inputs to the multipliers, the implementation of the elements thereof can be much more simplified than the implementation of elements which do use Gaussian multipliers. Thus, because the multipliers deal only with randomly switched signals (e.g., $\pm 1$) rather than Gaussian characteristics, such multiplier elements are much simpler and less expensive than the multipliers which are required when dealing with Gaussian characteristics. The attenuations of the multipliers dealing with randomly switched input signals which may be used for approximating the channel energy distribution, as discussed above, can be appropriately provided by using different magnitude gains (i.e., attenuators) in the lines which feed the randomly switched signal to the multipliers involved.

The overall configuration of cascade connected delay lines tends to lend itself more readily to modular construction wherein the delay lines can be fabricated as separate plug-in units and which can be made adaptable to accommodate different delay spreads for different signal channel simulations.

A modification of the configuration shown in FIG. 1, is depicted in FIG. 1A wherein the randomly switched operation provides output signals associated with each tap, the polarities of each of which vary among four values or states (e.g., $\pm 1(\pm i)$) in a random fashion. For simplicity, FIG. 1A shows a typical configuration which can be used with delay line 10 although it is understood that a similar configuration can be used for delay line 11. Thus, each of the tapped outputs 16 is supplied to a phase splitting device 16A which provides in-phase and quadrature components thereof which are supplied to multipliers 13A and 13B, respectively. Independent random switching signals $\pm 1$ are thereupon supplied to each of the multiplier 13A and 13B to provide the output signals from each tap for supply to summation circuit 15, the polarities of which switch randomly among the four states $\pm 1(\pm i)$ as desired.

Another exemplary embodiment of the invention is shown in FIG. 3 wherein the Gaussian multipliers are substantially the same as those shown in FIG. 1, as associated with delay line 35 while the multipliers associated with the shorter delay line 30 are used for providing random phase-modulated signals rather than random polarity modulated (±1) signals. Thus, the first delay line 30 has a channel input signal fed thereto and utilizes a plurality of taps 31 therealong which provide delay line output signals to a plurality of separate phase modulators 32. The phase modulators are supplied with signals from a plurality of signal sources 33 providing signals having random phases from 0° to 360°, the outputs of the phase modulators being supplied to a summation circuit 34 for providing an input signal to the second cascade-connected delay line 35. As before, delay line 35 has a plurality of tap outputs 35 which are supplied to a plurality of phase splitting devices 37 which provide both in-phase and quadrature components ("I" and "Q") each supplied to a plurality of multipliers 38. Each of the multipliers is in turn supplied by independent Gaussian signals from sources 39, the outputs of multipliers 38 being appropriately summed at summation circuit 41 to provide the simulated channel output signal.

An alternative embodiment to the arrangement of FIG. 3, is shown in FIG. 4 wherein a first delay line 50 has a plurality of spaced input taps 51, each of said input taps being supplied from one of the outputs of a plurality of multipliers 52. Pairs of multipliers 52A and 52B are supplied at the inputs thereof with an in-phase signal and a quadrature signal, respectively, from a phase-splitting circuit 53. The input to the phase-splitting circuit is the input signal which is to be fed to the simulated channel. Thus, the input signal is split into two components, in-phase and quadrature, respectively, indicated in FIG. 4 by the designations "I" and "Q", the in-phase component being supplied to each of the multipliers 52A and the quadrature component being supplied to each of the multipliers 52B. Such multipliers are in turn supplied with independent Gaussian signals from Gaussian signal sources 54. The single output signal from delay line 50 is supplied as the input to a second cascade-connected delay line 56 which utilizes a plurality of output taps 57. Each of the output taps supplies a delayed signal to one of a plurality of multipliers 58, the other inputs of which are supplied from a plurality of signal sources 59 such as random phase sources 59. The outputs of the multipliers are fed to a summation circuit 60 which thereupon provides the simulated channel output signal.

The configuration of FIG. 4 illustrates not only that the Gaussian sources can be utilized with the shorter delay lines of a cascade-connection thereof, but also that the delay lines can be utilized with a plurality of input taps having multipliers associated therewith rather than utilizing a single input and a plurality of output taps as in FIGS. 1 and 3. Further, if phase-splitting is required, the input signal to the delay line involved can be supplied to a phase splitter to supply common in-phase and quadrature components to each of the multipliers as shown. Such arrangements can be utilized in any of the various embodiments of the configurations discussed herein.

The invention can utilize many different types of delay lines elements, the operation thereof being compatible with the use of coaxial delay lines, surface wave delay lines, shift register delays, tape recorder delay signals, sonic delay lines, and the like. Appropriate amplifiers can be utilized in the circuits where needed for suitable amplitude scaling.

What is claimed is:

1. Apparatus for simulating the characteristics of a signal channel and responsive to a channel input signal to produce a simulated channel output signal, said apparatus comprising
   at least two cascade-connected delay line means, each responsive to a delay line input signal and having a selected number of tap outputs for providing a plurality of tap output signals therefrom;
   first means associated with all but a selected one of said delay line means for generating a plurality of randomly characterized signals;
   first further means associated with each of said all but one of said delay line means and responsive to the plurality of said tap output signals associated therewith and to said plurality of randomly characterized signals associated therewith for producing a plurality of intermediate signals from each of said all but one of said delay line means;
   first summing means associated with each of said all but one of said delay line means and responsive to said plurality of intermediate signals associated therewith for providing a delay line output signal representing the sum thereof;
   second means associated with said selected one of said delay line means for generating a plurality of Gaussian characterized signals;
   second further means associated with said selected one of said delay line means and responsive to the plurality of tap output signals associated therewith and to said Gaussian characterized signals for producing a plurality of intermediate signals from said selected one of said delay line means;
   second summing means associated with said selected one of said delay line means and responsive to said plurality of intermediate signals for providing a delay line output signal representing the sum thereof;
   the delay line input signal to the first of said cascade-connected delay line means being the channel input signal, the delay line signal from the last of said cascade-connected delay line means being the simulated channel output signal, and the delay line input signals of all of said delay line means other than said first delay line means being the delay line output signal from the immediately preceding delay line means of said cascaded delay line means.

2. Apparatus in accordance with claim 1 and further including
   a plurality of phase-splitting means associate with at least one of said delay line means and responsive to the plurality of tap output signals therefrom to provide in-phase and quadrature components of said tap output signals, the further means associated with said at least one of said delay line means being responsive to said in-phase and quadrature components.

3. Apparatus in accordance with claim 2 wherein said plurality of phase-splitting means is responsive to the tap output signals of said selected one of said delay line means, the second further means associated therewith being responsive to the in-phase and quadrature components provided thereby and to said plurality of Gaussian characterized signals.

4. Apparatus in accordance with claim 3 and further including means for selectively adjusting the amplitudes of said Gaussian characterized signals so as to produce a simulated channel output signal having a channel energy distribution characteristic which substantially approximates the channel energy distribution characteristic of the signal channel which is to be simulated.

5. Apparatus in accordance with claim 2 wherein said plurality of phase-splitting means is responsive to the tap outputs of one of said delay line means associated with a plurality of randomly characterized signals, the further means associated with said delay line means being responsive to the in-phase and quadrature components provided thereby and to said plurality of randomly characterized signals.

6. Apparatus in accordance with claim 5 wherein the polarities of said randomly characterized signals vary randomly between two states.

7. Apparatus in accordance with claim 5 wherein the phases of said randomly characterized signals vary in a random manner.

8. Apparatus in accordance with claim 1 wherein the polarities of said randomly characterized signals vary randomly between two states.

9. Apparatus in accordance with claim 1 wherein the phases of said randomly characterized signals vary in a random manner.

10. Apparatus in accordance with claim 1 wherein the tap outputs of each of said delay lines are substantially equally spaced therealong, the delay interval between the taps of each delay line means being selected to have a predetermined relationship with respect to the delay interval between the taps of each of the other delay line means.

11. Apparatus in accordance with claim 10 wherein said predetermined relationship is such that the delay interval between the taps of each delay line means other than the first delay line means in said cascade connection is substantially equal to the total delay interval of its immediately preceding delay line means.

12. Apparatus in accordance with claim 10 wherein said predetermined relationship is such that the delay interval between the taps of each delay line other than the last delay line means in said cascade connection is substantially equal to the total delay interval of its immediately succeeding delay line means.

13. Apparatus in accordance with claim 1 and further including
means for selectively adjusting the amplitude of said Gaussian characterized signals so as to produce a simulated channel output signal having a channel energy distribution characteristics which substantially approximates the channel energy distribution characteristic of the signal channel which is to be simulated.

14. Apparatus in accordance with claim 13 and further including
means for selectively adjusting the amplitude of the intermediate signals derived from the randomly characterized signals at a delay line means other than said selected one of said delay line means associated with the Gaussian characterized signals to produce a simulated channel output signal having a channel energy distribution characteristic which further approximates the channel energy distribution characteristic of the signal channel which is to be simulated.

15. Apparatus for simulating the characteristics of a signal channel and responsive to a channel input signal to produce a simulated channel output signal, said apparatus comprising
a plurality of cascade-connected delay line means, a first one or more of said plurality of delay line means being responsive to a delay line input signal and having a selected number of tap outputs for providing a corresponding number of tap output signals therefrom and a second one or more of said plurality of delay line means having a selected number of tap inputs responsive to a corresponding number of tap input signals for providing a delay line output signal;
first means for generating a plurality of randomly characterized signals;
second means for generating a plurality of Gaussian characterized signals;
first further means associated with each of said first one or more delay line means and responsive to the plurality of tap output signals associated therewith and to a plurality of signals selected from said first means or said second means for producing a plurality of first intermediate signals from each of said first one or more delay line means;
first summing means associated with each of said first one or more said delay line means and responsive to said first intermediate signals for producing a delay line output signal representing the sum thereof;
second further means associated with each of said second one or more delay line means and responsive to a plurality of input signals associated therewith and to a plurality of signals selected from said first generating meansor said second generating means for producing a plurality of second intermediate signals as tap input signals for each of said second one or more delay line means.

16. Apparatus in accordance with claim 15 wherein said second further means are responsive to said plurality of input signals and to said plurality of randomly characterized signals from said first generating means.

17. Apparatus in accordance with claim 16 and further including phase-splitting means associated with each of said second one or more delay line means and responsive to a delay line input signal to provide said plurality of input signals in the form of in-phase and quadrature component signals, said second further means being responsive to said in-phase and quadrature component signals.

18. Apparatus in accordance with claim 15 wherein said second further means are responsive to said plurality of Gaussian characterized signals from said second generating means.

19. Apparatus in accordance with claim 18 and further including phase-splitting means associated with each of said second one or more delay line means and responsive to a delay line input signal for providing said plurality of input signals in the form of in-phase and quadrature component signals, said second further means being responsive to said in-phase and quadrature component signals.

* * * * *